United States Patent
Furukawa et al.

(10) Patent No.: US 10,032,562 B2
(45) Date of Patent: Jul. 24, 2018

(54) ELECTROLYTIC CAPACITOR AND METHOD FOR MANUFACTURING SAME

(71) Applicant: Panasonic Intellectual Property Management Co., Ltd., Osaka (JP)

(72) Inventors: Takeshi Furukawa, Oita (JP); Yuichiro Inutsuka, Nagasaki (JP); Sawako Seki, Saga (JP); Ryo Kanasaki, Nagasaki (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/196,144

(22) Filed: Jun. 29, 2016

(65) Prior Publication Data

US 2016/0307703 A1  Oct. 20, 2016

Related U.S. Application Data

(63) Continuation of application No. PCT/JP2015/000151, filed on Jan. 15, 2015.

(30) Foreign Application Priority Data

Jan. 16, 2014  (JP) .................................. 2014-006149

(51) Int. Cl.
 *H01G 9/028* (2006.01)
 *H01G 9/15* (2006.01)
 (Continued)

(52) U.S. Cl.
 CPC .......... *H01G 9/028* (2013.01); *H01G 9/0036* (2013.01); *H01G 9/07* (2013.01); *H01G 9/15* (2013.01)

(58) Field of Classification Search
 None
 See application file for complete search history.

(56) References Cited

U.S. PATENT DOCUMENTS

6,191,013 B1   2/2001  Hahn et al.
2010/0107386 A1*  5/2010  Furukawa ............ H01G 9/0036
                                                              29/25.03

(Continued)

FOREIGN PATENT DOCUMENTS

CN   102005313 A    4/2011
JP   2002-526914    8/2002
(Continued)

OTHER PUBLICATIONS

International Search Report of PCT application No. PCT/JP2015/000151 dated Apr. 14, 2015.
(Continued)

*Primary Examiner* — Dion R Ferguson
(74) *Attorney, Agent, or Firm* — McDermott Will & Emery LLP

(57) ABSTRACT

A method for manufacturing an electrolytic capacitor of the present disclosure includes: preparing an anode member having a dielectric layer; then, impregnating the anode member with a monomer, an oxidant, a silane compound, and a solvent; and then forming a solid electrolyte layer including a conductive polymer containing a polymer of the monomer and a silicon-containing component derived from (Continued)

the silane compound on the surface of the dielectric layer. The above-mentioned monomer contains a compound represented by formula (I):

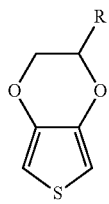

(I)

(wherein R represents an alkyl group having 1 to 10 carbon atoms).

6 Claims, 2 Drawing Sheets

(51) Int. Cl.
*H01G 9/00* (2006.01)
*H01G 9/07* (2006.01)

(56) References Cited

U.S. PATENT DOCUMENTS

| | | | |
|---|---|---|---|
| 2010/0136222 A1* | 6/2010 | Furukawa | H01G 9/0036 427/80 |
| 2011/0051321 A1 | 3/2011 | Yamaguchi et al. | |
| 2011/0188173 A1* | 8/2011 | Ota | H01G 9/26 361/525 |
| 2012/0284978 A1 | 11/2012 | Furukawa et al. | |
| 2013/0242467 A1* | 9/2013 | Biler | C09D 5/4476 361/504 |
| 2014/0334066 A1 | 11/2014 | Sugihara et al. | |

FOREIGN PATENT DOCUMENTS

| | | |
|---|---|---|
| JP | 2010-278360 | 12/2010 |
| JP | 2011-049458 | 3/2011 |
| JP | 2013-219208 | 10/2013 |
| JP | 2013-243393 | 12/2013 |
| WO | 2013/094462 | 6/2013 |

OTHER PUBLICATIONS

English Translation of Chinese Search Report dated Oct. 25, 2017 for the related Chinese Patent Application No. 201580002682.2.

* cited by examiner

ELECTROLYTIC CAPACITOR AND METHOD FOR MANUFACTURING SAME

RELATED APPLICATIONS

This application is a Continuation of International Application No. PCT/JP2015/000151, filed on Jan. 15, 2015, which in turn claims priority from Japanese Patent Application No. 2014-006149, filed on Jan. 16, 2014, the contents of all of which are incorporated herein by reference in their entireties.

BACKGROUND

1. Technical Field

The present disclosure relates to an electrolytic capacitor, and more particularly to an electrolytic capacitor having excellent withstand voltage characteristics.

2. Description of Related Art

With digitalization of electronic devices, capacitors used therefor have been also required to have a small size, large capacity, and low equivalent series resistance (ESR) in a high-frequency region.

As capacitors having a small size, large capacity, and low ESR, electrolytic capacitors using a conductive polymer, such as polypyrrole, polythiophene, polyfuran, and polyaniline, as cathode material are promising. For example, there has been proposed a capacitor element including an anode foil having a dielectric layer and a solid electrolyte layer which includes a conductive polymer as cathode material and is provided on the anode foil.

Above all, it is known that significantly low ESR of a solid electrolytic capacitor can be achieved by providing a solid electrolyte layer using poly(3,4-ethylenedioxythiophene) (hereinafter, referred to as "PEDOT") having extremely high electric conductivity as compared with an electrolyte solution. Furthermore, in the field of a solid electrolytic capacitor using PEDOT or derivatives thereof, many proposals for suppressing leakage current and improving withstand voltage characteristics have been made.

SUMMARY

Conventional methods cannot sufficiently achieve an effect of improving withstand voltage characteristics.

A method for manufacturing an electrolytic capacitor of the present disclosure includes: preparing an anode member having a dielectric layer; then, impregnating the anode member with a monomer, an oxidant, a silane compound, and a solvent; and then forming a solid electrolyte layer including a conductive polymer including a polymer of the monomer and a silicon-containing component derived from the silane compound on a surface of the dielectric layer. The above-mentioned monomer includes a compound represented by formula (I):

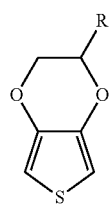

(wherein R represents an alkyl group having 1 to 10 carbon atoms).

An electrolytic capacitor of the present disclosure includes an anode member having a dielectric layer, and a solid electrolyte layer formed on a surface of the dielectric layer and including a conductive polymer and a silicon-containing component. The above-mentioned conductive polymer includes a polymer of a compound represented by formula (I):

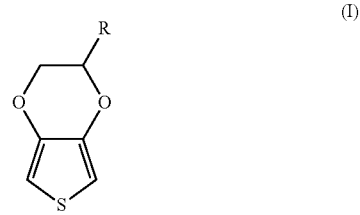

(wherein R represents an alkyl group having 1 to 10 carbon atoms).

The present disclosure can provide an electrolytic capacitor having excellent withstand voltage characteristics.

DESCRIPTION OF EMBODIMENTS

Hereinafter, the present disclosure is described more specifically based on the exemplary embodiment. However, the below-mentioned exemplary embodiment is not construed to limit the present disclosure.

<<Electrolytic Capacitor>>

Figure 1:
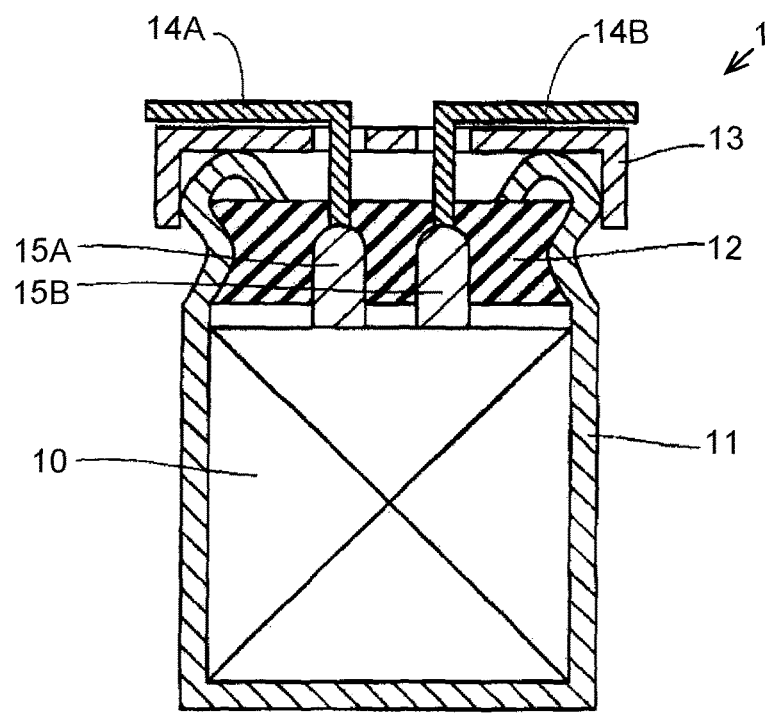
FIG. 1 is a sectional schematic view of an electrolytic capacitor in accordance with an exemplary embodiment of the present disclosure.
Figure 2:
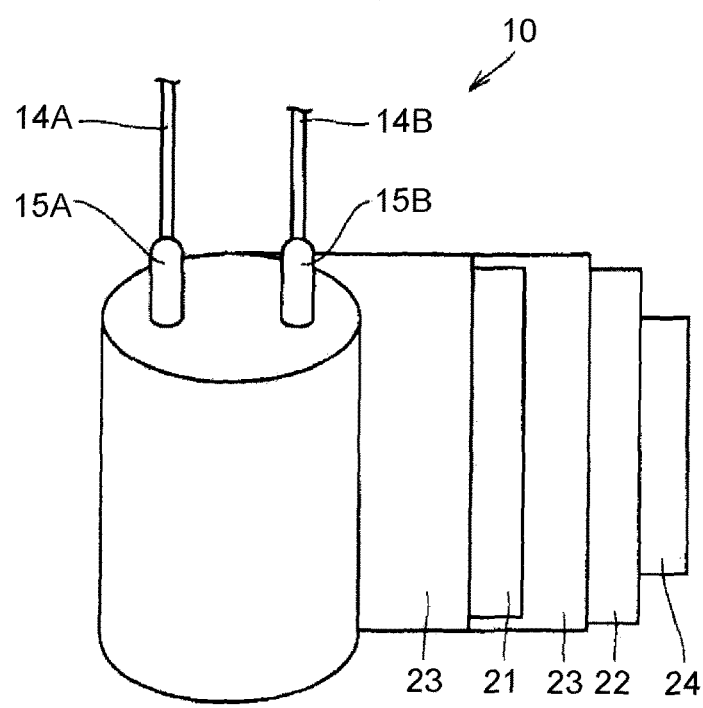
FIG. 2 is a schematic drawing to illustrate a configuration of a capacitor element of the electrolytic capacitor shown in FIG. 1.
Figure 3:
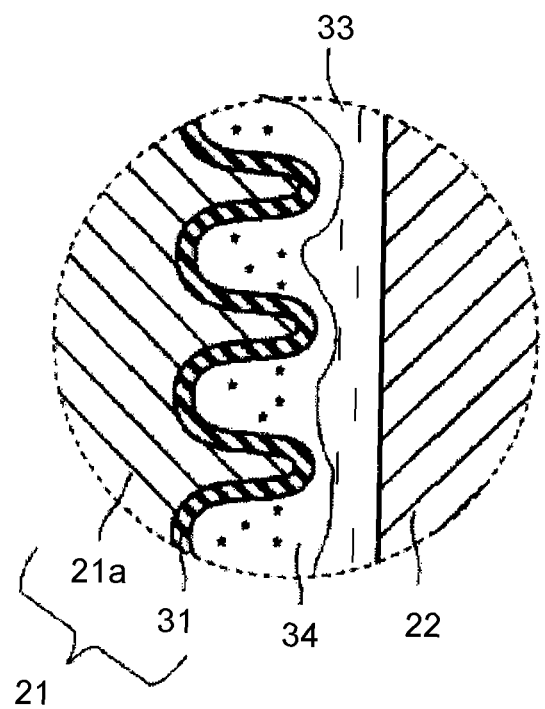
FIG. 3 is a sectional schematic view showing a configuration of a principal part of the capacitor element shown in FIG. 2.

FIG. 1 is a sectional schematic view of electrolytic capacitor 1 in accordance with an exemplary embodiment of the present disclosure. FIG. 2 is a schematic drawing in which a part of capacitor element 10 included in electrolytic capacitor 1 is expanded. FIG. 3 is an enlarged sectional view showing a configuration of a principal part in capacitor element 10.

As shown in FIG. 1, electrolytic capacitor 1 includes capacitor element 10, case 11 having a bottom, sealing member 12, seat plate 13, lead wires 14A and 14B, and lead tabs 15A and 15B. Capacitor element 10 is housed in case 11. Sealing member 12 closes an opening of case 11. Seat plate 13 covers sealing member 12. Lead wires 14A and 14B are led out from sealing member 12 and penetrate through seat plate 13. Lead tabs 15A and 15B connect lead wires 14A and 14B to electrodes of capacitor element 10, respectively. A vicinity of an opening end of case 11 is inwardly drawn, and the opening end is curled so as to be caulked to sealing member 12.

Capacitor element 10 includes a wound body shown in FIG. 2. The wound body is a semi-finished product of capacitor element 10. The wound body is formed by winding anode member (hereinafter, also referred to as an "anode body") 21 having a dielectric layer on a surface thereof, cathode body 22, and separator 23. Note here that in the wound body, solid electrolyte layer 34 including a conductive polymer is not formed between anode member 21 and cathode body 22. Lead tab 15A is connected to anode body 21, and lead tab 15B is connected to cathode body 22. Anode body 21 and cathode body 22 are wound with separator 23 interposed therebetween. An outermost periphery of the wound body is fastened with fastening tape 24. FIG. 2 is a partially developed view showing a state before the outermost periphery of the wound body is fastened.

As shown in FIG. 3, anode body 21 includes metal foil 21a whose surface is roughened to have irregularities thereon, and dielectric layer 31 formed on metal foil 21a.

Capacitor element 10 includes solid electrolyte layer 34 formed between anode body 21 and cathode body 22 of the wound body. That is to say, solid electrolyte layer 34 is formed on the surface of dielectric layer 31. Solid electrolyte layer 34 covers at least a part of the surface of dielectric layer 31 of anode body 21, and may cover at least a part of the surface of cathode body 22. Furthermore, solid electrolyte layer 34 may cover the surface of separator 23. Note here that capacitor element 10, together with non-aqueous solvent 33 or an electrolyte solution, may be housed in an outer case made of case 11, sealing member 12, or the like.

Electrolytic capacitor 1 includes solid electrolyte layer 34 including a conductive polymer including a polymer of a compound represented by formula (I), and a silicon-containing component. Solid electrolyte layer 34 is formed on a surface of dielectric layer 31 located on a surface of anode member 21 by impregnating the anode member with a monomer represented by formula (I), an oxidant, a silane compound, and a solvent.

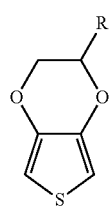

(I)

(wherein R represents an alkyl group having 1 to 10 carbon atoms).

The monomer represented by formula (I) is 3,4-ethylenedioxythiophene having an alkyl group as a side chain (hereinafter, referred to as "alkyl EDOT"). Formation of solid electrolyte layer 34 by using alkyl EDOT and a silane compound improves the withstand voltage characteristics of electrolytic capacitor 1. The conductive polymer including a polymer of alkyl EDOT (hereinafter, referred to as "alkyl PEDOT") and PEDOT have the same level of withstand voltage. However, the withstand voltage of electrolytic capacitor 1 using alkyl PEDOT is improved. The reason therefore is presumably as follows. That is to say, the conductive polymer is partially insulated by Joule's heat generated by a leakage current. At this time, since an insulated product of alkyl PEDOT has higher breakdown withstand voltage as compared with an insulated product of PEDOT, the withstand voltage as electrolytic capacitor 1 is presumably improved. In view of further improving the withstand voltage characteristics, the alkyl group has preferably 2 or more and 5 or less carbon atoms and preferably 3 or more and 5 or less carbon atoms.

Furthermore, anode member 21 may be impregnated with other monomers such as EDOT, which does not have an alkyl group. In this case, the mass ratio of alkyl EDOT occupied in the whole monomer (alkyl EDOT (g)×100/ (whole monomer of EDOT and alkyl EDOT and the like (g))) is preferably 10 to 90 mass %, more preferably 20 to 80 mass %, and particularly preferably 60 to 80 mass %. Furthermore, alkyl EDOTs having two or more types of different alkyl groups may be combined. In this case, the mass ratio of alkyl EDOT having an alkyl group having 3 to 5 carbon atoms (alkyl EDOT having an alkyl group having 3 to 5 carbon atoms (g)×100/(whole alkyl EDOT (g))) is preferably 10 to 90 mass %, more preferably 20 to 80 mass %, and particularly preferably 60 to 80 mass %.

It is considered that at least a part of the silane compound is incorporated into solid electrolyte layer 34 as the silicon-containing component, and the silane compound is interposed between the conductive polymers, or between the conductive polymer and other component such as dopant and chemically bonded thereto. This strengthens the bonding of the conductive polymers, and improves the withstand voltage characteristics. Furthermore, it is also considered that a part of the silane compound or the silicon-containing component derived therefrom is located at the interface between dielectric layer 31 and solid electrolyte layer 34, thus contributing to improvement of the adhesion property. In addition, by the effect of the silane compound or the silicon-containing component derived therefrom, an effect of improving densification of the conductive polymer in the vicinity of the interface between dielectric layer 31 and solid electrolyte layer 34, or the conductivity of the conductive polymer can be obtained.

In this exemplary embodiment, it is considered that the breakdown withstand voltage characteristics of the insulated product of alkyl PEDOT are further improved by the effect of the silane compound, and the withstand voltage of electrolytic capacitor 1 is further improved.

An amount of the silane compound to be used in a second process (impregnation process) is preferably 1 mass % or more and 35 mass % or less, and more preferably 5 mass % or more and 20 mass % or less when the total mass of the whole monomer, the oxidant, the silane compound, and the solvent is defined as 100 mass %. Such a range of the concentration enables an effect of improving the withstand voltage characteristics to be achieved, and increase of ESR to be easily suppressed.

Preferable examples of the silane compound include a silane coupling agent having hydrolyzability. Furthermore, the silane compound preferably includes an epoxy group or an acrylic group because of advantage in reduction of ESR or increase of capacity. Examples of the silane compound having an epoxy group include 2-(3,4-epoxycyclohexyl) ethyltrimethoxysilane, 3-glycidoxypropyltrimethoxysilane (γ-glycidoxypropyltrimethoxysilane), 3-glycidoxypropylmethyldiethoxysilane, 3-glycidoxypropyltriethoxysilane, and the like. Furthermore, examples of the silane compound having an acrylic group include 3-methacryloxypropylmethyldimethoxysilane, 3-methacryloxypropyltrimethoxysilane, 3-methacryloxypropylmethyldiethoxysilane, 3-methacryloxypropyl triethoxysilane, 3-acryloxypropyltrimethoxysilane (γ-acryloxypropyltrimethoxysilane), and the like. Examples of the other silane coupling agents include vinyl trichlorosilane, vinyl trimethoxysilane, vinyltriethoxysilane, p-styryltrimethoxysilane, N-2-(aminoethyl-3-aminopropylmethyldimethoxysilane, N-2-(aminoethyl)-3-aminopropyltriethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, N-(vinylbenzyl)-2-aminoethyl-3-aminopropyltrimethoxysilane hydrochloride, 3-ureidopropyltriethoxysilane, 3-chloropropyltrimethoxysilane, 3-mercaptopropylmethyldimethoxysilane, 3-mercaptopropyltrimethoxysilane, bis(triethoxysilylpropyl)tetrasulphido, 3-isocyanatepropyltriethoxysilane, and the like. These may be used singly or in combination of two or more thereof.

Any oxidants capable of polymerizing a monomer may be used. Examples thereof include sulfuric acid, hydrogen peroxide, iron (III), copper (II), chromium (VI), cerium (IV), manganese (VII), zinc (II), and the like. In particular, organic sulfonic acid metal salts containing these metal are preferable.

The organic sulfonic acid metal salt is preferably an aromatic sulfonic acid metal salt. Examples thereof include naphthalene sulfonic acid metal salt, tetralin sulfonic acid metal salt, alkyl benzene sulfonic acid metal salt, and alkoxy benzene sulfonic acid metal salt. Since the aromatic sulfonic acid metal salt has a function as a dopant in addition to a function as an oxidant, it is not necessary to additionally use a dopant. Furthermore, since the aromatic sulfonic acid metal salt is excellent in the function as a dopant, high-quality conductive polymer can be formed. In particular, it is preferable to use ferric p-toluenesulfonic acid which produces a conductive polymer having excellent conductivity and heat resistance.

The solvent may be water, a mixture of water and a non-aqueous solvent, or a non-aqueous solvent. The non-aqueous solvent is a generic name of liquid excluding water and water-containing liquid, and includes organic solvents and ionic liquid. The non-aqueous solvent is not particularly limited, and examples thereof include alcohols such as methanol, ethanol, propanol, butanol, ethylene glycol, and propylene glycol; amides such as formaldehyde, N-methylacetamide, N,N-dimethylformamide, and N-methyl-2-pyrrolidone; esters such as methyl acetate; ethers such as 1,4-dioxane; ketones such as methyl ethyl ketone, and the like.

<<Method for Manufacturing Electrolytic Capacitor>>

Hereinafter, an example of a method for manufacturing electrolytic capacitor 1 is described for each process.

(1) Process of Preparing Anode Body 21 Having Dielectric Layer 31 (First Process)

Firstly, metal foil 21a as raw material of anode body 21 is prepared. Types of meal are not particularly limited, but in view of easiness of formation of dielectric layer 31, it is preferable to use valve metal such as aluminum, tantalum, and niobium, or an alloy including valve metal.

Next, a surface of metal foil 21a is roughened. Roughening allows the surface of metal foil 21a to have a plurality of irregularities. It is preferable that the surface of metal foil 21a is roughened by etching metal foil 21a. Etching may be carried out by, for example, a direct-current electrolysis method or an alternating current electrolysis method.

Next, dielectric layer 31 is formed on the roughened surface of metal foil 21a. Formation methods of dielectric layer 31 are not particularly limited. Dielectric layer 31 can be formed by anodizing metal foil 21a. In anodization, for example, a metal foil is immersed in an anodization solution such as an ammonium adipate solution and heat-treated. Furthermore, a metal foil may be immersed in an anodization solution and a voltage may be applied thereto.

In general, in view of mass production, roughening and anodization are carried out with respect to a foil of, for example, a large-size valve metal (metal foil 21a). In this case, a foil, which has been anodized, is cut into a desired size to prepare anode body 21.

(2) Process of Preparing Cathode Body 22

Similar to anode body 21, a metal foil can be used for cathode body 22. Types of metal are not particularly limited, but valve metal such as aluminum, tantalum, and niobium, or an alloy containing the valve metal is preferably used. If necessary, the surface of cathode body 22 may be roughened.

(3) Production of Wound Body

Next, a wound body is produced by using anode body 21 and cathode body 22.

Firstly, anode body 21 and cathode body 22 are wound with separator 23 interposed therebetween. At this time, lead tabs 15A and 15B, which are respectively connected to anode body 21 and cathode body 22, are wound together. Thus, lead tabs 15A and 15B can be led out from the wound body as shown in FIG. 2.

For separator 23, for example, it is possible to use non-woven fabric mainly including cellulose, polyethylene terephthalate, vinylon, aramid fiber, and the like.

Also, material of lead tabs 15A and 15B is not particularly limited, and any conductive material may be used. Also, material of lead wires 14A and 14B respectively connected to lead tabs 15A and 15B is not particularly limited, and any conductive material may be used.

Next, fastening tape 24 is disposed to the outer surface of cathode body 22 located at the outermost layer in the wound anode body 21, and cathode body 22, and separator 23. Then, the end portion of cathode body 22 is fastened with fastening tape 24. Note here that when anode body 21 is prepared by cutting a large-size metal foil, the wound body may be further anodized in order to provide dielectric layer 31 on a cut surface of anode body 21.

(4) Process of Impregnating Anode Member with Monomer, Oxidant, Silane Compound, and Solvent (Second Process)

In a second process of impregnating anode member 21 with a monomer, an oxidant, a silane compound, and a solvent, the wound body is impregnated with, for example, a polymerization solution containing the monomer, the oxidant, the silane compound, and the solvent. For example, the wound body may be immersed in the polymerization solution. Time for immersing the wound body in the polymerization solution may be any time as long as productivity is not inhibited and the polymerization solution can reach the deep part of recess portions of dielectric layer 31, although depending upon the size of the wound body. However, a method for impregnating the anode member with the monomer, the oxidant, the silane compound, and the solvent is not particularly limited. For example, the wound body may be impregnated separately with a first solution including the monomer and with a second solution including the oxidant. At this time, the silane compound and the solvent may be included into any of the first solution and the second solution, or may be included in both the first and second solutions.

A preparation method of a polymerization solution is also not particularly limited. For example, the polymerization solution may be prepared by mixing the oxidant and the solvent with a mixture of the monomer and the silane compound. Alternatively, a polymerization solution may be prepared by preparing a mixture solution containing the oxidant, the silane compound, and the solvent, and then mixing the monomer into the resultant mixture solution. In particular, the polymerization solution is preferably prepared by the latter method. Thus, since the influence of the reaction heat is reduced, properties of the obtained conductive polymer are stabilized, so that an effect of improving withstand voltage characteristics is easily obtained. Furthermore, a larger amount of silane compounds can be incorporated into the conductive polymer.

(5) Process of Forming Solid Electrolyte Layer 34 (Third Process)

Next, uniform solid electrolyte layer 34 including a conductive polymer and a silicon-containing component is formed on a surface of dielectric layer 31 of anode body 21. For example, after the wound body is taken out of the polymerization solution, anode body 21 may be heated so as to facilitate the polymerization reaction of the monomer and to transpire the solvent.

When the monomer including alkyl EDOT is polymerized, the silane compound is incorporated, so that solid electrolyte layer 34 including a conductive polymer and a silicon-containing component derived from the silane compound is formed. Capacitor element 10 is produced by the above-mentioned process.

A weight-average molecular weight of the produced conductive polymer is, for example, about 103 to 106. Note here that the process of providing the polymerization solution and the process of forming solid electrolyte layer 34 may be repeated twice or more. When these processes are carried out a plurality of times, the coverage of dielectric layer 31 with solid electrolyte layer 34 can be enhanced. Solid electrolyte layer 34 is formed so as to cover at least a part of the surface of dielectric layer 31. At this time, solid electrolyte layer 34 may be formed on not only the surface of dielectric layer 31 but also cathode body 22 and separator 23. Furthermore, on solid electrolyte layer 34, a conductive polymer layer may be further formed by electrolytic polymerization. Solid electrolyte layer 34 formed on the surface of dielectric layer 31 functions as actual cathode material.

(6) Process of Impregnating Capacitor Element 10 with Non-Aqueous Solvent or Electrolyte Solution After solid electrolyte layer 34 is formed, capacitor element 10 may be impregnated with a non-aqueous solvent or an electrolyte solution. This can improve a repair function of dielectric layer 31, and further improve a reduction effect of ESR.

The non-aqueous solvent may be an organic solvent, or an ionic liquid. The non-aqueous solvent is desirably a high boiling solvent. Examples thereof include polyalcohols such as ethylene glycol and propylene glycol, cyclic sulfones such as sulfolane, lactones such as γ-butyrolactone, amides such as formaldehyde, N-methylacetamide, N,N-dimethylformamide, and N-methyl-2-pyrrolidone, esters such as methyl acetate, ethers such as 1,4-dioxane, ketones such as methyl ethyl ketone, and the like.

An electrolyte solution in which an organic salt as ionic material (solute) is dissolved in the non-aqueous solvent may be used. Examples of the organic salt include trimethylamine maleate, triethylamine borodisalicylate, ethyldimethylamine phthalate, mono 1,2,3,4-tetramethylimidazolinium phthalate, mono 1,3-dimethyl-2-ethylimidazolinium phthalate, and the like.

A method for impregnating capacitor element 10 with a non-aqueous solvent or an electrolyte solution is not particularly limited. It is preferable to employ a method for immersing capacitor element 10 into a vessel housing a non-aqueous solvent or an electrolyte solution because the method is simple and easy. Immersion time is, for example, one second to five minutes although depending upon the size of capacitor element 10.

(7) Process of Sealing Capacitor Element 10

Finally, capacitor element 10 is sealed. Specifically, firstly, capacitor element 10 is housed in case 11 such that lead wires 14A and 14B are located at the opening upper surface of case 11. As material of case 11, metal such as aluminum, stainless steel, copper, iron, and brass or an alloy thereof can be used.

Next, sealing member 12, which is formed such that lead wires 14A and 14B penetrate therethrough, is disposed at the upper part of capacitor element 10, and capacitor element 10 is sealed in case 11. Sealing member 12 is preferably dielectric material. The dielectric material is preferably an elastic body. Among them, silicone rubber, fluororubber, ethylene propylene rubber, Hypalon rubber, butyl rubber, and isoprene rubber, having high heat resistance, are preferred.

Next, the vicinity of the opening end of case 11 is drawn, and an opening end is caulked and curled to sealing member 12. Then, seat plate 13 is disposed at a curled part, electrolytic capacitor 1 as shown in FIG. 1 is completed. Thereafter, aging treatment may be carried out while a rated voltage is applied.

In the above-mentioned exemplary embodiment, a wound type electrolytic capacitor is described. However, the present disclosure is not limited to the above-mentioned application range, and the present disclosure can be applied to other electrolytic capacitors, for example, a chip-type electrolytic capacitor using a sintered body of metal as an anode body, and a laminate-type electrolytic capacitor using a metal plate as an anode body.

EXAMPLE

Hereinafter, the present disclosure is described in more detail with reference to Examples, but the present disclosure is not limited to the Examples.

Example 1

In this Example, a wound type electrolytic capacitor (8.0 mm in ϕ and 12.0 mm in L (length)) having a rated voltage of 35 V and a rated capacitance of 22 μF is produced. Hereinafter, a specific method for manufacturing an electrolytic capacitor is described.

<Process of Preparing Anode Body>

An aluminum foil having a thickness of 100 μm is subjected to etching so as to roughen a surface of the aluminum foil. Thereafter, a dielectric layer is formed on the surface of the aluminum foil by anodization. The anodization is carried out by immersing an aluminum foil in an ammonium adipate solution and applying a voltage of 60 V thereto. Thereafter, the aluminum foil is cut into a size having a width of 6 mm and a length of 120 mm so as to prepare an anode body.

<Process of Preparing Cathode Body>

An aluminum foil having a thickness of 50 μm is subjected to etching so as to roughen a surface of the aluminum foil. Thereafter, an aluminum foil is cut into a size having a width of 6 mm and a length of 120 mm to prepare a cathode body.

<Production of Wound Body>

An anode lead tab and a cathode lead tab to which a lead wire is connected are connected to the anode body and the cathode body, respectively. The anode body and the cathode body are wound with a separator interposed therebetween while the lead tabs are wound together. Then, the produced wound body is anodized again to form a dielectric layer at a cut end-portion of the anode body. Next, an end portion of the outer side surface of the wound body is fastened with a fastening tape to thus produce a wound body.

<Preparation of Polymerization Solution>

Next, a mixture solution containing ferric p-toluenesulfonic acid (oxidant), 3-acryloxypropyl trimethoxysilane (silane compound) and ethanol (solvent) is prepared. Ethylated EDOT (monomer) represented by formula (I) wherein R is an ethyl group is added to and mixed with the resultant mixture solution to obtain a polymerization solution. The concentration of the silane compound is 20 mass % with respect to the total amount of the monomer, the oxidant, the silane compound, and the solvent. Similarly, the concentration of the solvent is 36 mass %, the concentration of the oxidant is 24 mass %, and the concentration of the monomer is 20 mass %.

<Process of Impregnating Wound Body with Polymerization Solution>

Three hundreds of the above-produced wound bodies are prepared, and each of the wound bodies is immersed in a polymerization solution for about 3 to 10 seconds.

<Process of Forming Solid Electrolyte Layer by Polymerization of Monomer>

Next, after the wound body is taken out of the polymerization solution, the wound body is heated at 210° C. for 3 minutes to produce a conductive polymer, so as to form a solid electrolyte layer. The fact that the solid electrolyte layer contains a silicon-containing component derived from a silane compound is confirmed by energy-dispersive X-ray spectroscopy. From the above-mentioned process, a capacitor element shown in FIG. 2 is produced.

<Process of Sealing Capacitor Element>

The obtained capacitor element is sealed to complete an electrolytic capacitor. Specifically, firstly, a capacitor element is housed in a case having a bottom such that a lead wire is located at an opening side of the case. A rubber packing as the sealing member formed such that a lead wire penetrates therethrough is disposed at the upper part of the capacitor element, thereby to seal the capacitor element in the case. Then, the vicinity of the opening end of the case is drawn. Furthermore, the opening end is curled, and a seat plate is disposed on the curled portion. Thus, an electrolytic capacitor as shown in FIG. 1 is completed. Thereafter, aging treatment is carried out with a rated voltage applied at 130° C. for two hours.

A capacitance, ESR, and a leakage current (LC) of the obtained electrolytic capacitor are measured. Furthermore, a voltage is applied while the voltage is increased at a rate of 1.0 V/sec, and a breakdown withstand voltage (BDV) at which 0.5 A of overcurrent flows is measured. Note here that each property is obtained as an average value with respect to 300 samples. The results are shown in Table 1.

Examples 2 to 6 and Comparative Examples 1 to 4

Electrolytic capacitors are produced in the same manner as in Example 1 except that the monomers shown in Table 1 and 3-glycidoxypropyltrimethoxysilane as the silane compound are used, and evaluated as mentioned above. In Comparative Examples 1, 3, and 4, a silane compound is not used. In Examples 5 and 6 and Comparative Example 4, the total amount of two types of monomers used (the parenthesis in Tables show a mass rate) is made to be 20 mass %. The results are shown in Table 1.

TABLE 1

| | Monomer | Silane compound concentration (mass %) | capacity (µF) | ESR (mΩ) | LC (µA) | Withstand voltage (V) |
|---|---|---|---|---|---|---|
| Ex. 1 | Et-EDOT | 20 | 33 | 15.5 | 8 | 88 |
| Ex. 2 | Et-EDOT | 20 | 33 | 15.8 | 10 | 85 |
| Ex. 3 | Pp-EDOT | 20 | 33 | 15.7 | 8 | 105 |
| Ex. 4 | Bt-EDOT | 20 | 33 | 16.0 | 3 | 122 |
| Ex. 5 | Et-EDOT:30/Bt-EDOT:70 | 20 | 33 | 15.8 | 3 | 102 |
| Ex. 6 | EDOT:30/Bt-EDOT:70 | 20 | 34 | 15.2 | 7 | 98 |
| Co. Ex. 1 | EDOT | — | 35 | 15.3 | 56 | 43 |
| Co. Ex. 2 | EDOT | 20 | 34 | 15.9 | 15 | 67 |
| Co. Ex. 3 | Bt-EDOT | — | 34 | 15.2 | 34 | 57 |
| Co. Ex. 4 | Et-EDOT:30/Bt-EDOT:70 | — | 33 | 15.1 | 41 | 52 |

Et-: ethylated,
Pp-: propylated,
Bt-: butylated
Ex.: Example,
Co. Ex.: Comparative Example As shown in Table 1, it is shown that withstand voltage is extremely high and a leakage current is small in Examples 1 to 6 using alkyl EDOT and a silane compound as compared with Comparative example 2 using EDOT and a silane compound. Furthermore, in comparison between Example 4 and Comparative Example 3, it is shown that the silane compound improves the withstand voltage. The effect of improving the withstand voltage in the above comparison is greater than in comparison between Comparative Example 1 using only EDOT and Comparative Example 2 using EDOT and a silane compound. This shows that the withstand voltage in the present disclosure is improved by a synergistic effect of an alkyl EDOT and a silane compound.

Examples 7 to 10

Electrolytic capacitors are produced in the same manner as in Example 1 except that the concentration of the silane compound is changed as shown in Table 2, and evaluated in the same manner as mentioned above. The results are shown in Table 2.

TABLE 2

| | Monomer | Silane compound concentration (mass %) | Capacity (µF) | ESR (mΩ) | LC (µA) | Withstand voltage (V) |
|---|---|---|---|---|---|---|
| Ex. 7 | Bt-EDOT | 5 | 33 | 15.0 | 6 | 108 |
| Ex. 8 | Bt-EDOT | 20 | 33 | 16.0 | 3 | 122 |
| Ex. 9 | Bt-EDOT | 30 | 31 | 20.5 | 1 | 128 |
| Ex. 10 | Bt-EDOT | 35 | 29 | 63.3 | 1 | 135 |

Bt-: butylated,
Ex.: Example

It is shown from Table 2 that in Example 7 in which the concentration of the silane compound is 5 mass % and Example 8 in which it is 20 mass %, as compared with Comparative Example 3 in which a silane compound is not contained, the ESR value is almost the same, but the leakage current is small, and the withstand voltage is extremely high. Furthermore, Examples 9 and 10 in which the concentration of the silane compound is 30 mass % or more are excellent in an effect of reducing the leakage current and an effect of improving the withstand voltage although the ESR value is somewhat increased.

As mentioned above, the present disclosure can be used for an electrolytic capacitor using a solid electrolyte layer as cathode material.

What is claimed is:

1. A method for manufacturing an electrolytic capacitor, the method comprising:
   preparing an anode member having a dielectric layer;
   impregnating the anode member with a monomer, an oxidant, a silane compound, and a solvent; and
   forming a solid electrolyte layer on a surface of the dielectric layer, the solid electrolyte layer including a conductive polymer including a polymer of the monomer and a silicon-containing component derived from the silane compound,
   wherein the monomer includes a compound represented by formula (I):

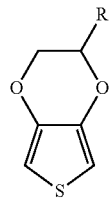

(I)

wherein R represents an alkyl group having 1 to 10 carbon atoms.

2. The method according to claim 1, wherein R in the formula (I) is an alkyl group having 2 or more and 5 or less carbon atoms.

3. The method according to claim 1, wherein an amount of the silane compound with which the anode member is impregnated is 1 mass % or more and 35 mass % or less relative to 100 mass % of a total amount of the monomer, the oxidant, the silane compound, and the solvent.

4. The method according to claim 1, wherein an amount of the silane compound with which the anode member is impregnated is 5 mass % or more and 20 mass % or less relative to 100 mass % of a total amount of the monomer, the oxidant, the silane compound, and the solvent.

5. The method according to claim 1, wherein the impregnating of the anode member with the monomer, the oxidant, the silane compound, and the solvent includes:
   preparing a mixture solution of the solvent, the silane compound, and the oxidant;
   preparing a polymerization solution by mixing the mixture solution and the monomer with each other; and
   impregnating the anode member with the polymerization solution.

6. An electrolytic capacitor comprising:
   an anode member having a dielectric layer; and
   a solid electrolyte layer formed on a surface of the dielectric layer and including a conductive polymer and a silicon-containing component,
   wherein the conductive polymer includes a polymer of a compound represented by formula (I):

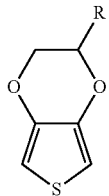

(I)

wherein R represents an alkyl group having 1 to 10 carbon atoms.

* * * * *